Figure 1:
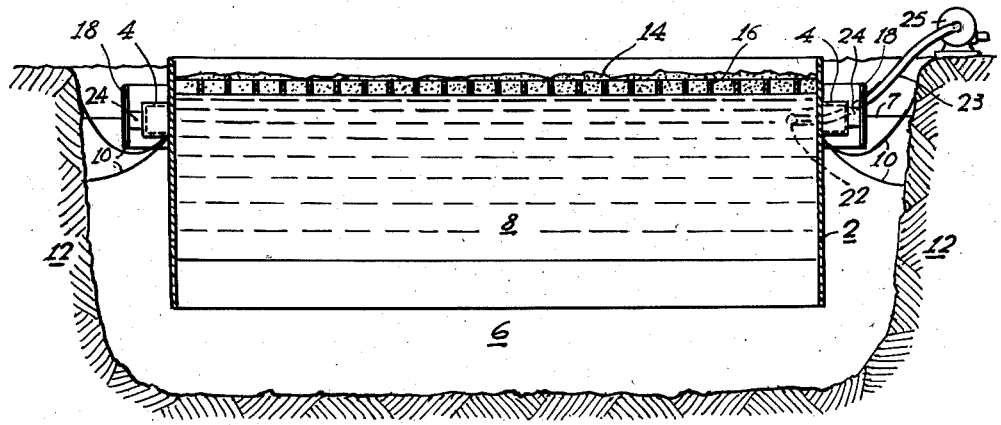

July 9, 1957  P. W. CORNELL ET AL  2,798,633
STORAGE APPARATUS

Filed March 2, 1954  2 Sheets-Sheet 1

INVENTORS.
Paul W. Cornell and
BY Russell S. Knappen.
ATTORNEYS

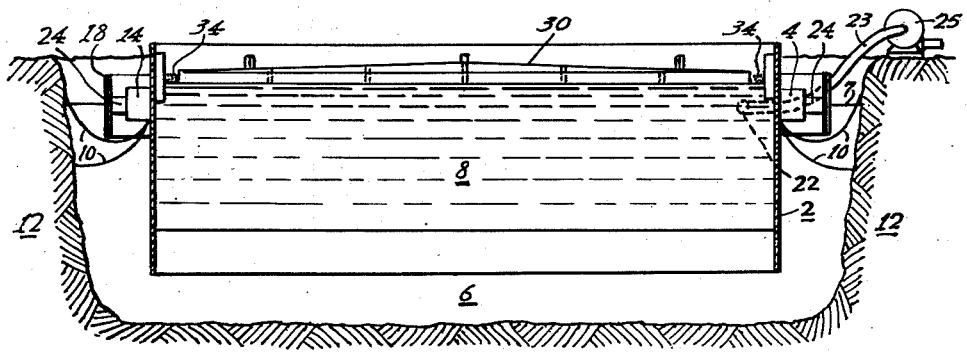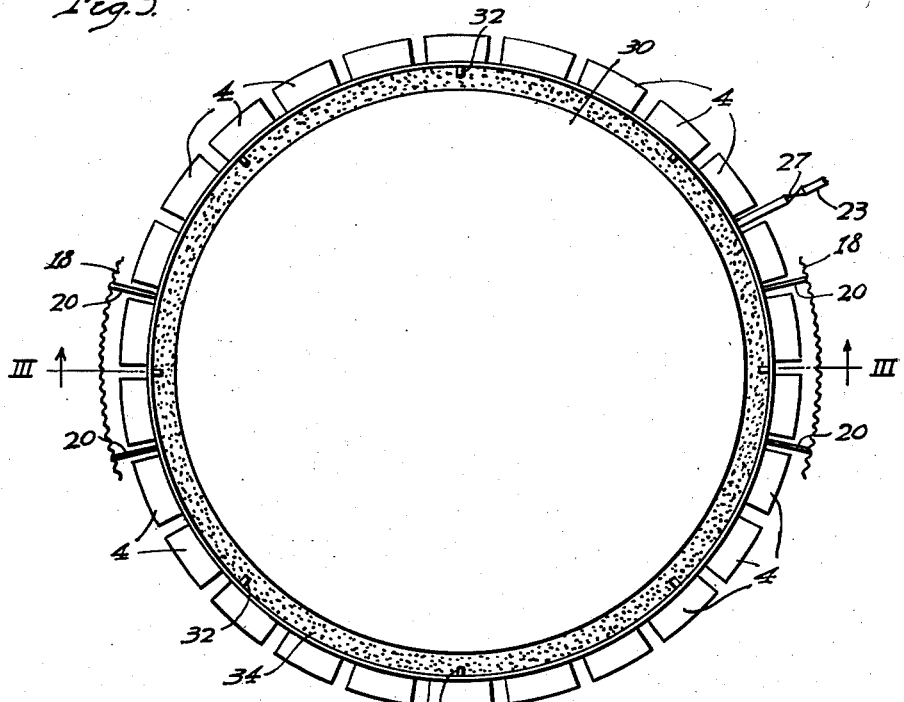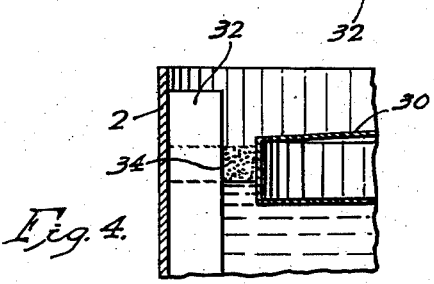

United States Patent Office

2,798,633
STORAGE APPARATUS
Paul W. Cornell, Mount Lebanon Township, Allegheny County, Pa., and Russell S. Knappen, Tulsa, Okla., assignors to Gulf Oil Corporation, Pittsburgh, Pa., a corporation of Pennsylvania Application March 2, 1954, Serial No. 413,648

5 Claims. (Cl. 220—26)

This invention relates to storage methods and apparatus and more particularly to methods and apparatus for storage of large quantities of water-immiscible liquids whose specific gravities are less than that of water.

Substantial increases in the consumption and production of petroleum products during recent years have been accompanied by serious storage problems because of a general absence of proportionate increases in storage facilities.

In addition to the storage problems arising as a result of expanding production, a further serious problem may arise as a result of any protracted unbalance in the demand for the bulk liquid products of the petroleum industry because of the extremely large volumes concerned. This problem may be compounded by the fact that it is often necessary to continue to produce large quantities of a product that is already in oversupply, in order that the demand for concurrently produced products may be satisfied. For example, large production and inventories of heating oils are virtually inevitable during the summer months although demand for these products is low, since such oils are concurrently produced with gasoline, which is in greatest demand during the same period.

In view of the continuing expansion of the petroleum industry and the high cost of supplying the necessary storage facilities, the attention of the industry has recently turned toward use of natural or artificially provided terrestrial cavities. For example, petroleum oils having a specific gravity less than that of water have been stored in natural or artificially-formed, impervious, underground caverns and also in so-called "Edholm-type" containers, i. e., terrestrial cavities in which surfaces permeable to the stored liquid and contacted by the same are positioned below the local water table.

The present invention provides a novel and advantageous method and structure for the storage of water-immiscible liquids having a specific gravity less than that of water. The invention requires a relatively small amount of steel or other structural material, primarily because certain existing terrain features and conditions are utilized to advantage in the over-all storage system. Briefly, the invention includes the steps of floating a laterally closed container and a column of the water-immiscible liquid confined therein in a body of water having a depth greater than the submerged depth of the container, the lower surface of said column of liquid being in direct contact with the water.

The invention also encompasses means suitable for carrying out the foregoing storage method, including a laterally closed, bottomless container adapted to confine a floating column of the stored liquid, and a body of water directly supporting the confined floating column of liquid, which body of water has a depth greater than the submerged depth of the container. The container is supported by flotation so that its elevation varies directly with the upper level of the body of water. The invention includes, together with the foregoing, the use of a protective cover floating on the upper surface of the stored liquid. The invention may also include in combination with the aforesaid storage container an ice shield comprising a skirt member encircling the container and confining a floating annular column of water-immiscible anti-free liquid.

Figure 2:
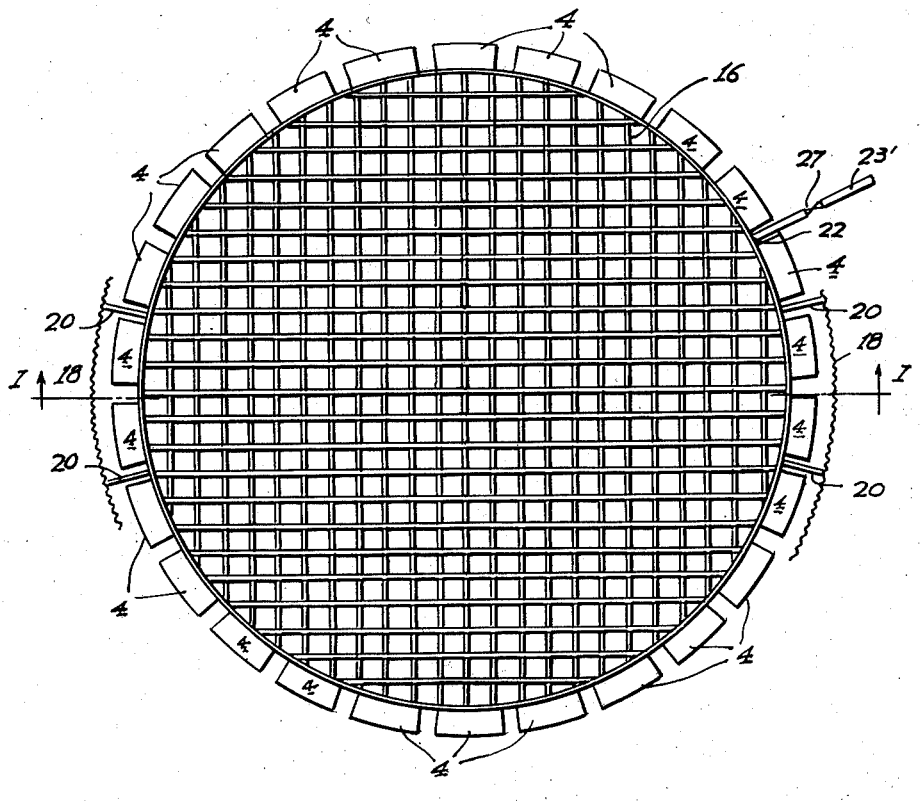

Referring now briefly to the drawings, Figure 1 is a schematic vertical sectional view, partly broken away, of a laterally closed container that confines a column of stored liquid, wherein each of said container and said column of liquid are floated in a body of water contained in a land-locked reservoir. Figure 2 is a schematic plan view of the container in Figure 1. Figure 3 is a schematic view in vertical section of another embodiment of the invention. Figure 4 is an enlarged view, partly broken away, of a portion of the structure shown in Figure 3. Figure 5 is a plan view of the structure of Figure 3. In the various figures, like numerals represent identical or similar elements.

It is understood that in the accompanying description and figures of drawings the specific embodiments of the invention shown and described are intended as illustrative only and are not to be considered as limiting.

A number of important advantages of the invention are attributable to the fact that the storage container and the column of stored liquid confined therein are both supported entirely by flotation, and as a consequence, partially beneath the surface of the supporting body of water. Supporting the column of oil itself by flotation is advantageous for the reason that no foundation or bottom for the container is necessary. A considerable savings in construction materials is thereby effected. Flotation of the storage container, as well as the column of stored liquid, is highly advantageous since by virtue of this expedient the elevation of the storage container in relation to the level of the stored liquid tends to remain constant notwithstanding variations in the level of the supporting body of water. Consequently, the possibility of loss of the stored liquid from the storage container with a change in the water level is reduced. The fact that a considerable portion of the storage container is submerged beneath the surface of the body of water in which the container and stored liquid are floated permits a large saving in wall thickness requirements, for the reason that the hydrostatic pressure of the stored column of water-immiscible liquid and the hydrostatic pressure of the ambient body of water tend to offset each other.

While the herein described storage method and apparatus are especially designed for and adapted to the storage of large quantities of petroleum oils of relatively low volatility, e. g., diesel fuel, domestic heating oils, industrial and marine fuel oils, weathered crude oils, topped crude oils, etc., it will be apparent that the principles thereof are also suited to the storage of other water-immiscible liquids having a specific gravity less than that of water, e. g., lard oil, cottonseed oil, soybean oil, linseed oil, olive oil and the like. The invention also includes storage of relatively volatile water-immiscible liquids such as gasoline and kerosene. Advantages of the invention are greatest for liquids having a specific gravity close to 1.0.

Having described the general nature and applicability of the invention, as well as various advantages thereof, we shall now describe the invention in greater detail, with particular reference to the accompanying figures of drawing. Referring now to these drawings in detail, in Figure 1 a bottomless cylindrical storage container 2 is supported by peripherally mounted floats or pontons 4, which are in turn supported by flotation in a body of water 6 contained within the permeable earthen or rock walls 12 of a natural or artificial reservoir. A column of a water-immiscible liquid having a specific gravity of less than 1, e. g., a petroleum distillate fuel oil of the No. 2 boiling range, is confined within laterally closed container 2. Owing to the lower density of the stored oil, a portion of the height of the column of oil is supported above the upper level 7 of the body of water 6.

Numeral 14 designates a layer of substantial thickness of discrete, oil- and water-insoluble, low-density particles, e. g., gas-filled, plastic micro-balloons, or an equivalent thereof, floated on the upper surface of oil 8. The layer of micro-balloons functions to reduce the possibility of evaporative losses and also to reduce any deteriorative action of sunlight upon the stored oil by forming a barrier having low heat transmitting properties, substantial resistance to the passage of oil vapors, and substantial resistance to harmful light rays. Although the layer of discrete particles functions as a barrier in the sense indicated, it permits free passage of water droplets therethrough. The depth of the layer of micro-balloons 14 is substantially uniform and is stabilized against the drifting action of wind currents through the compartmentalizing effect of grid member 16. Grid member 16 is floated upon the surface of the stored column of oil 8 and is unattached to the storage container.

The height of the storage cylinder is as illustrated sufficient not only to contain the stored column of oil, the layer of plastic micro-balloons and the floating grid member but also to provide some excess wall height or depth at the top and bottom of the container as a precaution against losses of oil due to turbulence of the body of water or the body of oil. Advantageously, the excess wall depth beneath the oil is several times the excess height above the oil column, since the only visible index of the depth of the oil column, i. e., the height of the oil above the water level, varies but slightly with large changes in the depth of oil below water level. Thus, for a No. 2 fuel oil having a specific gravity of 0.85, overfilling by one foot above water level corresponds to overfilling by nearly six feet below water level.

The storage cylinder 2 is stabilized against drifting by means of anchor lines 10 attached both to storage container 2 and to the walls 12 of the water reservoir. Numeral 22 designates an opening positioned in the storage cylinder shell at the level 7 of body of water 6, which opening is equipped with valve means 27 through which the oil or other stored liquid is passed while the storage cylinder is filled or emptied. During periods in which the oil is being pumped into or out of the storage container, a pump 25 is connected to opening 22 by means of a flexible hose connection 23. Where the water level is well below ground level, the pump 25 may advantageously be positioned on a ponton provided for that purpose. Additional openings, valves, connections, and pumps may of course be provided to expedite filling and emptying.

Numeral 18 refers to a light, flexible, corrugated, annular skirt member positioned about storage cylinder 2 and associated therewith and spaced apart therefrom by means of spacing bars 20 that are attached both to the inner surface of said skirt member and to the outer surfaces of pontons 4 and/or to the outer surface of the storage container. The flexible annular skirt member is provided as a shield against the crushing action of ice and functions in a manner more apparent from a subsequent description relative to this member. Element 18 extends above and below the surface of the water to a height and depth sufficient to contain an annular column of liquid 24. Numeral 24 designates an annular column or layer of water-immiscible anti-freeze liquid which has a specific gravity of less than that of water positioned between the storage container wall and the corrugated skirt member 18. The annular column of liquid 24 is supported in part above the water level owing to its lower specific gravity. The depth of the annular column of liquid 24 beneath the water surface is at least equal to the maximum customary ice depth for the locality. In the illustrated modification water-immiscible anti-freeze liquid 24 is desirably identical with the stored fuel oil 8.

In operation, the storage cylinder 2 is floated with enough of its height above water to contain the maximum height of the oil column. The grid 16 and micro-balloons 14 are floated in the water within the cylinder 2. Oil is pumped from a source not shown through hose connection 23, valve 27, and inlet 22 beneath the grid 16 and micro-balloons 14. As additional oil is pumped into the container, the level of the water surface beneath the oil is depressed while grid 16 and micro-balloons 14 rise with the level of the oil upon which they are floated. Oil may be pumped into cylinder 2 until only the desired safety margin at the top and bottom remain unfilled. By way of example, when storing an oil having a specific gravity of 0.85, 1.5 feet of each 10 feet of stored oil will be above the water level 7 and the balance will be below the outside water level 7. The storage cylinder is emptied in the reverse manner.

Figures 3, 4, and 5 relate to a modification of the invention embodying a different kind of floating roof structure. In these figures, numeral 30 refers to a buoyantly stable, hollow, air or gas-filled, disc-like roof structure floating in oil 8. The outer diameter of roof 30 is somewhat less, although not greatly less, than the inner diameter of cylinder 2, in order to facilitate upward and downward movement of the roof with the upward and downward movement of the oil column 8. As shown, the roof structure floats in the oil transversely of, and coaxially with, cylinder 2, the radius of the roof being normal to the vertical walls of cylinder 2. The upper surface of roof 30 is illustrated as slightly conical in order to provide a pitch facilitating water runoff. Suitable spacing between cylinder 2 and roof 30 is maintained by means of vertically positioned guide ribs 32, attached to the inner surface of cylinder 2. If desired the spacing ribs may be mounted on the roof structure, instead of the container. Another suitable spacing means comprises a plurality of uniformly disposed spacing bars, mounted on the periphery of the roof structure, and having rollers associated with their outer ends, which rollers are adapted to engage the surface of the container.

In this modification, protection against vapor loss, harmful light, and heat is provided by means of a seal 34 comprising an annular floating layer of discrete particles of the same type as those forming protective layer 14 in Figures 1 and 2.

The roof structure 30 may be constructed of a "skin" of sheet metal, plastic, steel plate, impregnated plywood, or the like, over a suitable supporting framework. A suitable supporting framework can, for example, be constructed of a plurality of radially disposed structural members, which may themselves be further reinforced by one or more concentrically arranged reinforcing elements, e. g., of tubular steel or aluminum, or wire rope, transversely connecting said radially disposed members. The radially disposed members may themselves be floatable in the oil. Alternatively, a suitable framework may simply comprise a series of parallel members arranged transversely of said roof structure, and spaced apart by somewhat less than the maximum feasible span width for the particular covering material chosen. The grid structures previously described can also serve as a supporting framework for the roof structure.

The modification shown in Figures 3, 4 and 5 is advantageous because it provides a reduced risk of vapor loss, and greater protection against heat and harmful light.

Considering now the individual component elements of the present invention in greater detail the storage container referred to above is one which is adapted laterally to confine a floating column of the stored water-immiscible liquid. This container thus comprises a laterally closed partitioning member which functions to separate the ambient atmosphere and water from the column of stored liquid.

No bottom closure is necessary for the herein disclosed storage container, nor is one desirable, since substantial savings in structural material are achieved by the elimination of the container bottom. Moreover, the storage container is thus made self-cleaning, i. e., sludge, sediment and the like formed or contained in the stored liquid can settle completely out of the stored liquid and the container.

The herein described storage container may be fashioned of welded or riveted steel plates of the type suitable for conventional above-ground storage tanks. These plates should be of a thickness sufficient to withstand the maximum pressure differential to be encountered. Although highly suitable containers may be formed from steel, the invention naturally includes the use of other structural materials, e. g., aluminum alloys, suitably reinforced molded or laminated synthetic resinous materials, impregnated and reinforced concrete, plywood that has been impregnated with a suitable resinous material, and the like. The pontons or floats may be constructed of like materials and may be rigidily or flexibly attached to the periphery of the container.

Inasmuch as the storage container of this invention is, over most of its height, required to withstand only the pressure differential between the floating column of stored liquid and the ambient body of water, rather than the differential between the hydrostatic pressure of the stored liquid and the atmosphere, a great saving in the volume of structural material required for the storage container walls is realized. Naturally, the portion of the confined column of stored liquid which is supported above the water level because of the lower specific gravity of the former will develop a hydrostatic head exactly comparable with that developed for the same height of liquid in conventional, above-ground storage tanks. However, a great saving in the volume of structural material for the container walls arises from the fact that only a relatively small portion of the column is supported above the upper level of the water. For example, during storage of a water-immiscible liquid having a specific gravity of 0.9, approximately nine-tenths or 90 percent of the height of the column of stored liquid will be at or below the ambient water level. The maximum resistance to bursting required of a container adapted to confine a column of liquid having the above-indicated characteristics is only about 10 percent of that required by a column of the same liquid of the same height when stored in a conventional above-ground storage tank. Maximum resistance to bursting, i. e., maximum strength, is required at the water level, that is, at the bottom of the portion of the column of stored liquid which is supported above water level.

As indicated, in the instance of steel storage containers it will often be most economical to utilize steel plate of a thickness normally made for use in above-ground storage tanks. This is true in spite of the fact that the minimum thickness in which such plates are made will generally be considerably in excess of the thickness required for the present storage container. Nothwithstanding this fact, a large saving in steel volume is effected, since steel plate of relatively low or even the minimum conventional thickness can be used throughout or virtually throughout the entire height of the container.

An indication of the saving in steel plate requirements for the storage container can be obtained from the following tables which compare the minimum thickness required for the steel walls of a storage container 60 feet tall that is constructed according to the present invention and for a conventional above-ground storage stank of the same height and capacity. The thickness requirements listed are for successive, conventional annular steel courses, each 6 feet in height. For the purpose of this comparison the stored liquid is assumed to be a column of petroleum distillate fuel oil boiling within the No. 2 range and having a specific gravity of 0.85, said column being 60 feet in height, of which 9 feet are above the water level. Table A shows inside pressures, outside pressures, pressure differentials and required wall thickness at various depths for the above-ground tank. Table B shows corresponding values for the storage cylinder of the present invention.

TABLE A

*Conventional storage*

| No. of Course, Top to Bottom | Inside Pressure, Middle of Course, p. s. i. g. | Outside Pressure, Middle of Course, p. s. i. g. | Pressure Differential, Middle of Course, p. s. i. g. | Required Wall Thickness, In. Steel |
|---|---|---|---|---|
| 1 | 1.1 | 0 | 1.1 | 0.25 |
| 2 | 3.3 | 0 | 3.3 | 0.32 |
| 3 | 5.5 | 0 | 5.5 | 0.50 |
| 4 | 7.7 | 0 | 7.7 | 0.67 |
| 5 | 9.9 | 0 | 9.9 | 0.85 |
| 6 | 12.1 | 0 | 12.1 | 1.02 |
| 7 | 14.4 | 0 | 14.4 | 1.20 |
| 8 | 16.6 | 0 | 16.6 | 1.37 |
| 9 | 18.8 | 0 | 18.8 | 1.55 |
| 10 | 21.0 | 0 | 21.0 | 1.72 |
| Average | | | | 0.945 |

TABLE B

*Present invention*

| No. of Course, Top to Bottom | Inside Pressure, Middle of Course, p. s. i. g. | Outside Pressure, Middle of Course, p. s. i. g. | Pressure Differential, Middle of Course, p. s. i. g. | Required Wall Thickness, In. Steel |
|---|---|---|---|---|
| 1 | 1.1 | 0 | 1.1 | 0.25 |
| 2 | 3.3 | 0 | 3.3 | 0.258 |
| 3 | 5.5 | 2.6 | 2.9 | 0.25 |
| 4 | 7.7 | 5.2 | 2.5 | 0.25 |
| 5 | 9.9 | 7.8 | 2.1 | 0.25 |
| 6 | 12.1 | 10.4 | 1.7 | 0.25 |
| 7 | 14.4 | 13.0 | 1.4 | 0.25 |
| 8 | 16.6 | 15.6 | 1.0 | 0.25 |
| 9 | 18.8 | 18.2 | 0.6 | 0.25 |
| 10 | 21.0 | 20.8 | 0.2 | 0.25 |
| Average | | | | 0.2508 |

It will be noted from the foregoing tables that the maximum pressure differential which the storage container of the present invention is required to withstand is only about 15 percent of the maximum to be withstood by a conventional above-ground tank of equivalent volume and form.

Comparison of the foregoing tables further indicates that notwithstanding the use of a large amount of unnecessarily thick steel plates, enough steel is saved by the present invention in the construction of the container walls alone to build nearly two additional storage containers of identical size. To this saving in steel can be added the steel normally required in the construction of a tank bottom, as can, in many instances, a portion or all of the steel used in constructing the roof of a conventional storage tank.

The shape of the storage container is most conveniently cylindrical in view of the structural advantages possessed by a container of this shape, and in view of the fact that construction materials are readily available for building containers of this form. The container will, of course, be designed for buoyant stability, i. e., so that the metacenter of the floating column of stored liquid will be above its center of gravity.

The storage containers of the present invention are adjusted to float at a depth such as to laterally confine the entire height of the column of stored liquid above and below the water level. Whether the container is supported by means of pontons, floats or the like attached to the outer or inner periphery of the storage container, the portion of the container which must be supported above and below water should be determined in advance for the particular liquid to be stored. Should the container be supported by means of floats or the like attached to the inner periphery of the container, suitable allowance must be made for the lower specific gravity (and therefore the reduced buoyancy) of the stored liquid, and for the fact that the container will rise and fall with the upper level of the column of stored liquid.

As indicated, advantages in regard to structural material saved and a reduced risk of loss of stored liquid are obtained merely by flotation of the column of stored liquid and its laterally confining, bottomless container in a body of water whose depth is greater than the submerged depth of the container. The over-all results thus produced may be considerably enhanced, however, by provision of some degree of protection to the stored liquid against the deteriorating action of sunlight and/or a hindrance to vaporization, where this is a problem. The invention therefore includes achievement of these objectives by flotation on the surface of the column of stored liquid of a protective covering, unattached to the storage container, which may comprise a conventional floating roof, the rigid, disc-like structure described above, or a covering layer of inert oil- and water-insoluble, low-density material, such as the hollow, spherical, plastic, gas-filled micro-balloons referred to above. These plastic micro-balloons are known in the art and, per se, form no part of this invention. However, in the interest of clarity it may be mentioned that typical micro-balloons are formed of an oil- and water-insoluble synthetic resinous material, normally of the thermo-setting type, such as phenol-aldehyde, or substituted phenol-aldehyde resins, e. g., phenol-formaldehyde, phenol-furfural, cresol-formaldehyde, etc. Typical micro-balloons possess a bulk density of about 8.7 pounds per cubic foot, a particle density of about 20.6 pounds per cubic foot, an average particle size of 0.0013 inch, and a particle size range of from about 0.0002 inch to about 0.0036 inch. While the plastic micro-balloons described are used in a preferred embodiment, other discrete, low-density particles of similar properties may be used. Examples of such materials are expanded vermiculite and perlite, and blocks or lumps of inert plastic or glass foams. Such foams are stable, gas-expanded, cellular, solid, low-density materials and are normally produced by rapid solidification and/or polymerization of a molten material containing a multiplicity of gas bubbles.

The present invention employs the above-indicated floating cover material in layers of a thickness sufficient to impede the passage of vapors and to eliminate or substantially impede passage of harmful light rays and heat. Thus, the invention may include the use of protective layers having a depth of about 0.5 inch to about 6 or more inches, the thickness varying according to the density, opacity and other properties of the particulate material, as well as according to the nature of the stored liquid. The discrete nature of the particles renders the protective layer thereof permeable to the passage of raindrops, melting snow, and the like.

Although discrete particles are advantageous in the cover layer for the reasons indicated, use of a continuous, flexible, cover layer may sometimes be desirable. A flexible cover layer formed of an inert plastic foam and containing apertures for water runoff may be used in such instances.

Since the above-described layer of discrete particles is exposed to the drifting action of wind currents, it is desirable to provide a grid structure of the general type illustrated in Figures 1 and 2, having apertures of a diameter and depth such that the depth gradient produced by the wind will not result in baring any portion of the stored liquid. Preferably, the diameter and depth of the grid apertures are such that the minimum thickness of the layer of particles, allowing for the maximum gradient due to wind action, will be fully adequate to achieve the desired impedance to vapors, light, and heat. Thus, the invention includes the use of gratings of from as little as 1 inch to more than 12 inches across the smallest diameter. The depth of the grid member of course varies with the depth of the particle layer. Naturally, the most advantageous dimensions are those involving the least over-all cost. The grid member may be constructed, for example, from two intersecting groups of parallel members, each member of which is formed from an abutting series of lap-jointed elements made of some low-density material, such as wood. If desired, the grid member may be constructed of hollow metal, inflated oil-resistant rubber or plastic, plastic foam, or other low-density material, in order that it may be floated in the stored liquid. Alternatively, the grid member may be made of sheet steel or the like, notched at the intersections, and may be floated by means of pontons. One or several layers of large-mesh subway grating or expanded metal sheets also form suitable grid members.

Although of necessity the roof structures illustrated in the drawings are limited in number, the invention further includes the use of conventional floating roof structures (not shown), one example being a ponton-supported floating roof having a peripherally mounted, flexible sealing skirt.

Where the severity of the climate dictates, suitable protection against the crushing action of ice may be provided for the container. Accordingly, the present invention includes in combination with the storage container an ice shield comprising the aforesaid encircling skirt member 18. This skirt member is of greater diameter and less height that the container itself and is preferably formed of light construction material such as, for example, corrugated sheets of galvanized steel, aluminum or reinforced plastic, all of which are readily available since they are used in inexpensive roofing. These sheets of material are welded, riveted or otherwise fastened together to form the desired skirt member.

The ice shield structure further includes a layer of a water-immiscible anti-freeze liquid having a specific gravity of less than that of water, and a freezing point substantially below that of water, floating on the water between the container walls and the skirt member. The anti-freeze liquid may in appropriate instances conveniently comprise the liquid being stored. Thus, in the storage of No. 2 fuel oil the anti-freeze liquid is most conveniently No. 2 fuel oil. The anti-freeze liquid should extend at least to the maximum customary local ice depth and the skirt member preferably extends below the surface of the water to a slightly greater degree. The skirt member should extend above the surface of the water at least to the height at which the annular column of anti-freeze liquid will be supported and preferably somewhat in excess thereof.

The skirt member 18 is spaced apart from said associated with the storage container by means of spacing bars of suitable length as illustrated in Figure 2.

In operation, the force caused by expansion of freezing ice is directed against the flexible skirt member and against the cushioning action of the column of anti-freeze liquid within the skirt member. As will be evident from the drawings the column of anti-freeze liquid is free to move upwardly or downwardly with deformation of the skirt member.

Other temporary or premanent measures against ice action may be taken, for example, steam or hot water lines may be installed about the container at water level. These or other heating means may also be used to reduce the viscosity of the stored liquid during periods in which it is being pumped, where the viscosity of the stored liquid is so great as to hinder ease of flow.

As indicated, the laterally closed storage container of this invention together with its confined column of liquid is floated partly beneath and partly above the surface of a body of water. While the broad principles of the invention are applicable to any body of water, however large, practically considered, greatest advantages are realized by use of the storage container in combination wtih a relatively small, sheltered reservoir. This is true, since the need for providing structural strength solely for the purpose of withstanding wave or wind action is eliminated. This, although the herein disclosed storage method and apparatus include storage in, for example, lakes or rivers and artificially or naturally sheltered portions thereof, they are best suited for use in combination wtih small, land-locked reservoirs such as are formed by abandoned, water-containing quarries or the like. Because of the relative absence of wave action and because of the shelter from wind provided by the customarily steep sides of such reservoirs, reduced structural strength is required for the storage container.

The water level of such reservoirs corresponds to and varies directly with the local water table or ground-water level. Thus, the water level is responsive to the hydrostatic pressure developed in the area by ground-water. While water in such reservoirs will normally be predominantly fresh, and therefore have a specific gravity very close to 1.0, the ground-water in other localities, for example, coastal areas, may contain high concentrations of inorganic salts without adversely influencing the principles of present storage method or system. However, in such instances, allowance must be made for the greater height above water at which the column of stored liquid will be supported and the greater pressure differentials resulting from the increased height above water of the stored column of liquid.

The body of water in the reservoirs should be of a depth greater than that to which the lowermost, submerged portion of the container extends, in order to provide adequate opportunity for free ingress or egress of water into the bottom of the container during periods in which the stored liquid is being pumped into or out of the container. Preferably, the depth of the body of water should exceed the submerged depth of the storage container by at least the difference between the water depth at the time of storage and the customary minimum local water depth. This precaution may be conveniently observed in any case by simply choosing a depth for the storage container such that the difference between the submerged depth of the container and the depth of the water will at least equal the customary local fluctuation in the water level.

In a specific embodiment of the invention, a 280,000 barrel column of No. 2 fuel oil, 50 feet in depth, is floated within a floating, bottomless, cylindrical container having a diameter of 200 feet and formed of welded steel plates having a thickness of 0.25 inch. The submerged depth of the container exceeds the submerged depth of the stored column of oil by 10 feet as a safety factor against loss of oil into the surrounding body of water. The column of oil extends approximately 7.5 feet above and 42.5 feet below the surface of the water, and the container extends 52.5 feet below the water surface. The walls of the container extend 6.0 feet above the upper surface of the oil column for a total height of 66 feet, or eleven 6-foot rings. The container is supported by a plurality of hollow, air-filled steel floats that are uniformly disposed about and welded to the periphery of the container. These floats are in turn supported by the buoyant force of the water contained in the surrounding reservoir, a limestone quarry or pit containing water of a depth of more than 100 feet, the customary maximum local fluctuation of the water table being approximately 20 feet.

A hollow, disc-like, roof structure having a cone-shaped upper surface and a diameter of somewhat less than that of the container, is floated on the surface of the column of oil. The roof structure is kept apart from the storage container by vertical ribs attached to the inner surface of the container and spaced uniformly about the same. The vertical ribs extend above the surface of the oil and below water level 7 to cover the maximum traverse of the roof. A protective seal is provided by a layer of plastic micro-balloons 2 inches or less in depth, floating on the surface of the oil, between the roof and the container. The thickness of the roof at the edges at least exceeds the depth of micro-balloons and increases to the center of the roof at a rate sufficient to provide the desired pitch.

As already briefly indicated, the expedient of supporting both the column of oil and its laterally confining storage container by flotation results in certain fundamental advantages which are not possible when neither the stored liquid or its container is supported by flotation. These beneficial results accrue in part out of the fact that the elevation of the storage container, the elevation of the stored liquid and the ambient water level adjust themselves in relation to one another with changing conditions, so as always to maintain an equilibrium. Thus, according to the present invention both the oil column and the storage container rise and fall directly in proportion to fluctuations in the level of the supporting body of water, and there is no need for constant attention to and adjustment of the water or oil levels with changing conditions. According to the present invention, liquid may be stored with substantial freedom from danger of its loss into the surrounding formations with large fluctuations in the local water level. Unlike some below ground-level storage systems, the present invention does not require costly excavations, foundations and the like. The unattached, independently floating cover for the stored liquid is light, self-supporting, inexpensive and pervious to rain and melting snow or ice. While large savings in structural material are effected by use of this cover, the desired reduced passage of light, heat and vapors is achieved.

In addition to the foregoing, the present invention is advantageous since it permits use of comparatively larger storage containers. This results in a lower cost per unit storage volume. A further large saving in steel or other construction material is made possible by the use of relatively thin container walls, and by the omission of a container bottom. The omission of the container bottom not only saves construction material but causes the container to be self-cleaning. The present invention also eliminates grading and foundation costs encountered with above-ground tank structures.

Miscellaneous additional advantages inherent in the invention include low insurance costs as a result of locating the storage container below ground level. This virtually eliminates lightning hazards as well as the possibility of damage to adjacent property in case of fire. The fact that the bulk of the surface of the storage container is normally submerged beneath the surface of the water results in reduced painting costs. The cost of pumping the stored liquid is reduced according to the principles of the present invention, since filling the storage container involves pumping against a back pressure equal to only a small fraction of that encountered in conventional above-ground storage of comparable size. At the same time, the required discharge pumping capacity is no greater in the present invention than for any above-ground tank. Moreover, contact of stored liquid in direct and indirect heat exchange relation with a relatively large body of water serves to maintain the stored liquid at a constant low temperature. This in turn results in additional protection against decomposition or other degradation reactions, evaporation and the like.

It is understood that many variations of the above-described method and system may be practiced without departing from the spirit of the invention or the scope of the appended claims.

We claim:

1. Means for storing a water-immiscible liquid having a specific gravity less than that of water, comprising a hollow, open-ended cylindrical container of relatively rigid structure, adapted laterally to confine a floating column of said water-immiscible liquid and positioned vertically in a body of water which directly supports said floating column of liquid, the upper surface of the floating column of liquid extending above the upper surface of the body of water, said body of water having a depth greater than the submerged depth of the cylindrical container, supporting float means positioned about the periphery of the container and associated therewith so as to support a minor portion of the container above the upper surface of the body of water, the height of said minor portion being greater than the height of the upper surface of the floating column of liquid, a vertically movable, impermeable member freely floating within said container on the upper surface of the floating column of liquid, the horizontal dimensions of said member being less than, but approximately conterminous with, the horizontal dimensions of the container, said member being adapted to cover a portion of the upper surface of said column, and a permeable layer of discrete, oil- and water-insoluble particles, of a depth sufficient to impede the passage of heat, vapors and harmful light, floating on and covering the portion of the upper surface of the floating column of liquid that is not covered by said impermeable member.

2. In combination with the structure of claim 1, an ice shield for said bottomless container comprising a laterally closed, relatively flexible skirt member of slightly greater diameter and substantially lesser height than said container spaced apart from and positioned about said container and extending above and beneath the surface of the water, a plurality of spacing members associated with an adapted to separate the bottomless container and the skirt member, a water-immiscible anti-freeze liquid whose specific gravity and freezing point are less than the corresponding physical constants for water, floating in the body of water and extending beneath the surface of the water to but not much greater than a depth at least equal to the customary maximum local ice depth, said water-immiscible liquid being positioned between and laterally confined by the bottomless container and the skirt member.

3. The apparatus of claim 2 where the anti-freeze liquid is a petroleum oil.

4. Means for storing a water-immiscible liquid having a specific gravity less than that of water, comprising a hollow, open-ended cylindrical container, adapted laterally to confine a floating column of said water-immiscible liquid, and positioned vertically in a body of water which directly supports said floating column of liquid, the upper surface of the floating column of liquid extending above the upper surface of the body of water, said body of water having a depth greater than the submerged depth of the cylindrical container, a plurality of supporting floats positioned about the periphery of the container and associated therewith so as to support a minor portion of the container above the upper surface of the body of water, the height of said minor portion being greater than the height of the floating column of liquid, a vapor and liquid impermeable disc-like roof structure freely floating in the column of oil within said cylindrical container and transversely thereof, said roof structure having a slightly smaller diameter than said cylindrical container, a plurality of spacing members adapted to maintain the roof structure spaced apart from the cylindrical container, and an annular seal positioned between the cylindrical container and said roof structure, adapted to impede passage of heat, vapors, and harmful light, comprising a permeable floating layer of discrete, inert, oil- and water-insoluble particles.

5. Means for storing a water-immiscible liquid having a specific gravity less than that of water, comprising a hollow, open-ended cylindrical container of relatively rigid structure, adapted laterally to confine a floating column of said water-immiscible liquid and positioned vertically in a body of water which directly supports said floating column of liquid, the upper surface of the floating column of liquid extending above the upper surface of the body of water, said body of water having a depth greater than the submerged depth of the cylindrical container, supporting float means positioned about the periphery of the container and associated therewith so as to support a minor portion of the container above the upper surface of the body of water, the height of said minor portion being greater than the height to which the upper surface of the floating column of liquid extends, a permeable layer of discrete, oil- and water-insoluble particles, having a depth sufficient to impede the passage of heat, vapors and harmful light, floating on the upper surface of the floating column of liquid, a vertically movable grid member freely floating within said container on the upper surface of the floating column of liquid and transversely subdividing said permeable layer of discrete particles, the horizontal dimensions of said grid member being less than, but approximately conterminous with, those of the container, said grid member being adapted to stabilize the depth of said layer of discrete particles.

References Cited in the file of this patent

UNITED STATES PATENTS

| | | |
|---|---|---|
| 34,426 | Howard | Feb. 18, 1862 |
| 1,561,260 | Mallery | Nov. 10, 1925 |

FOREIGN PATENTS

| | | |
|---|---|---|
| 794,360 | France | 1936 |

OTHER REFERENCES

Page 43 of the Oil and Gas Journal of July 6, 1953.